(12) United States Patent
de Ment

(10) Patent No.: US 6,728,755 B1
(45) Date of Patent: Apr. 27, 2004

(54) DYNAMIC USER PROFILING FOR USABILITY

(75) Inventor: William S. de Ment, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 682 days.

(21) Appl. No.: 09/675,428

(22) Filed: Sep. 26, 2000

(51) Int. Cl.$^7$ .............................................. G06F 13/100
(52) U.S. Cl. ...................................... 709/203; 705/10
(58) Field of Search ....................... 705/1, 10, 7; 348/1, 348/2; 455/2; 709/200, 203, 217; 707/104, 506

(56) References Cited

U.S. PATENT DOCUMENTS 6,070,145 A * 5/2000 Pinsley et al. ................. 705/10

OTHER PUBLICATIONS

Reade, Devin "Re: HP PCL level 3 commands" newsgroups: comp.sys.apple2.programmer (Google) Feb. 3, 1999.*

* cited by examiner

*Primary Examiner*—Robert B. Harrell

(57) ABSTRACT

The present invention provides a method of acquiring user information from users of a web tool in order to characterize users of the particular web tool. In one embodiment, the method involves providing the web tool to web users over the Internet, and providing to a web user the opportunity to take a pop-up survey in response to the user using the tool. In this way, actual user information relating to the user's use of the web tool is automatically and conveniently elicited from the user through the pop-up survey if the user selects to take the survey.

16 Claims, 12 Drawing Sheets

DYNAMIC USER PROFILING FOR USABILITY

TECHNICAL FIELD

The present invention relates to usability testing. In particular, the present invention relates to a method for identifying a test group for a usability test.

BACKGROUND

In order to perform a usability study or test for improving a web tool such as a search engine, an expert-system technical-assistance tool, or a user-group forum, a typical user of the tool must be identified. That is, a user group must be characterized so that the test can be accurately directed to representative users of the tool (or at least to persons who are relevantly similar to actual users). Surprisingly, many tool designers and administrators are not sufficiently knowledgeable of the users who are actually using their tools. With regard to web tools, a representative should be identified in terms of various factors such as computer experience, environment, and existing preferences.

Traditional methods for identifying representative users have included the use of market research firms for assembling focus groups and administering sometimes inconvenient surveys. Not only can such methods be expensive, but also, they can be very inaccurate because the surveyed persons may not even use the tool—at least to the extent claimed. In addition, with the surveys being sometimes lengthy and cumbersome, respondents will answer questions inaccurately in order to quickly get through the survey.

Accordingly, an improved method is needed for identifying a web tool user group.

SUMMARY OF THE INVENTION

The present invention is directed to a method of acquiring user information from users of a web tool in order to characterize users of the particular web tool. In one embodiment, the method provides the web tool to web users over the Internet, and provides users an opportunity to participate in a pop-up survey in response to their use of the tool. In this way, actual user information relating to the user's use of the web tool is automatically and conveniently elicited from the user through the pop-up survey if the user selects to take the survey.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
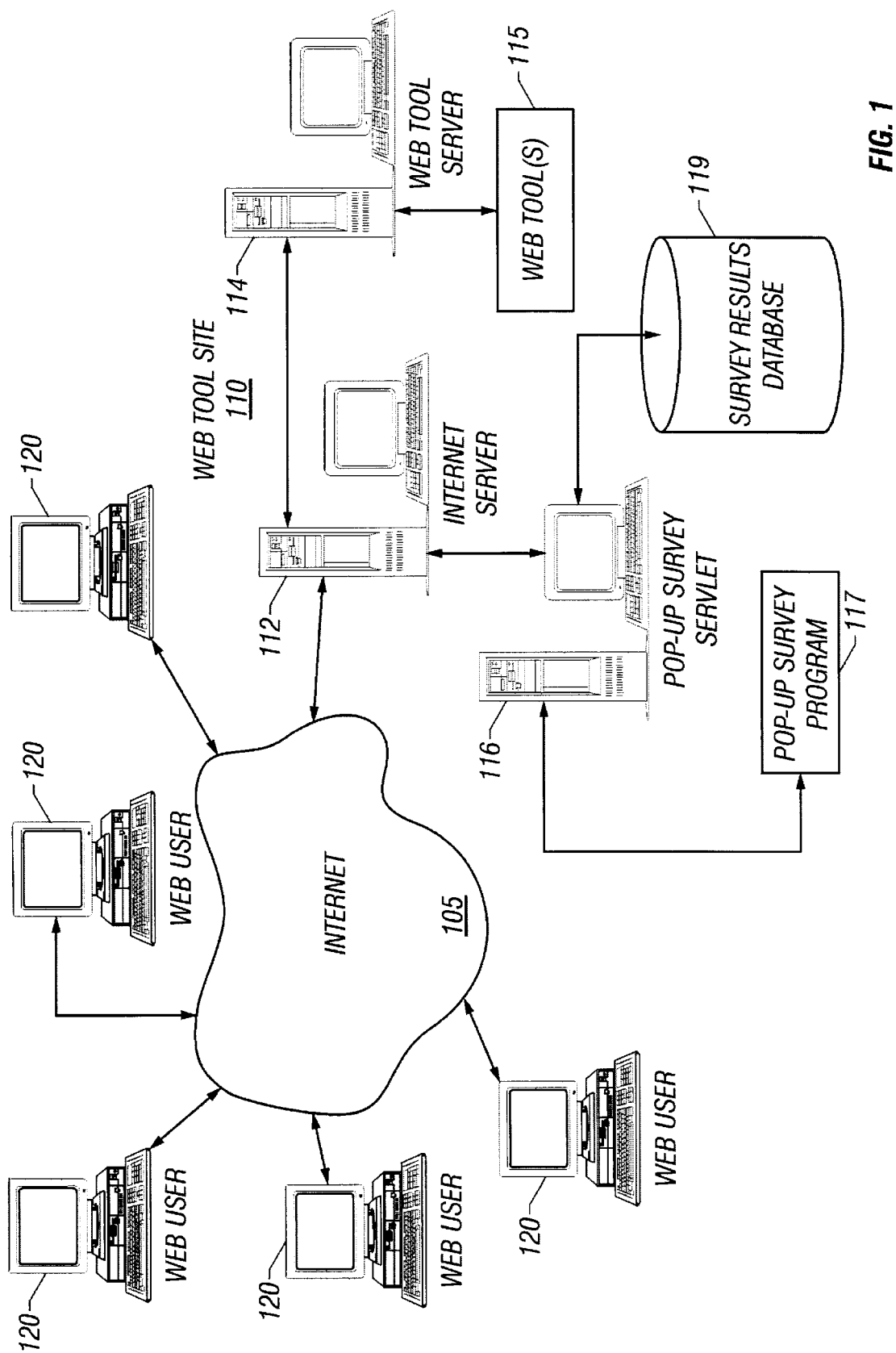
FIG. 1 is a block diagram depicting one embodiment of a web site system for implementing the present invention.

FIG. 1 shows one embodiment of a web tool site system 110 of the present invention. Web site system 110 is connected to multiple user computers 120 through the portion of the Internet 105 known as the World Wide Web (the Web). In the depicted embodiment, web site system 110 generally includes Internet server 112, web tool server 114, and pop-up survey servlet 116. Internet server 112 communicatively links web user computers 120 on the Internet 105 to the web tool server 114, as well as to the pop-up survey servlet 116. In addition, web tool server 114 has one or more web tool programs 115 for providing web users with various web tool functions (e.g., search engine). Similarly, servlet 116 includes a pop-up survey program 117 for providing pop-up surveys and gathering the corresponding survey data. It is also operably connected to a survey results database 119 for storing the result data from the pop-up surveys.

The web user computers 120 can be any form of Internet access device, including a computer, personal data assistant, or Internet appliance with an appropriately operable web browser. Likewise, the Internet server 112, web tool server 114, and pop-up survey servlet 116 can be implemented with any suitable combination of one or more computers, including but not limited to mainframes, workstations, or personal computers, running operating systems such as Windows NT, UNIX, LINUX, or any other computer operating system.

Internet server 112 provides web users with access to the web tool(s) 115, which are executed on web tool server 114. The Internet server 112 includes Internet enabling software, which facilitates the web site for providing Internet users to the Web tool(s) 115. Internet enabling software may be implemented with any suitable Internet enabling software such as Apache, Microsoft IIS, and Netscape Enterprise Server.

Web tool server 114 executes and provides to web users the one or more web tools 115. In one embodiment, these web tools include tools for assisting users in acquiring desired information (e.g., product information, technical assistance) from a company web site. Such tools could include but are not limited to a keyword search engine, a natural language search engine, a user group forum, and a case-based expert system help desk. For example, users of Hewlett Packard's www.hp.com web site in its "Customer Care Center" can use the "QUICKFIND" search tool. Web tool information and forms transferred from a server are typically formatted in a hypertext mark-up language (HTML) and can include text, programs, graphics, video, and audio portions.

Figure 2A:
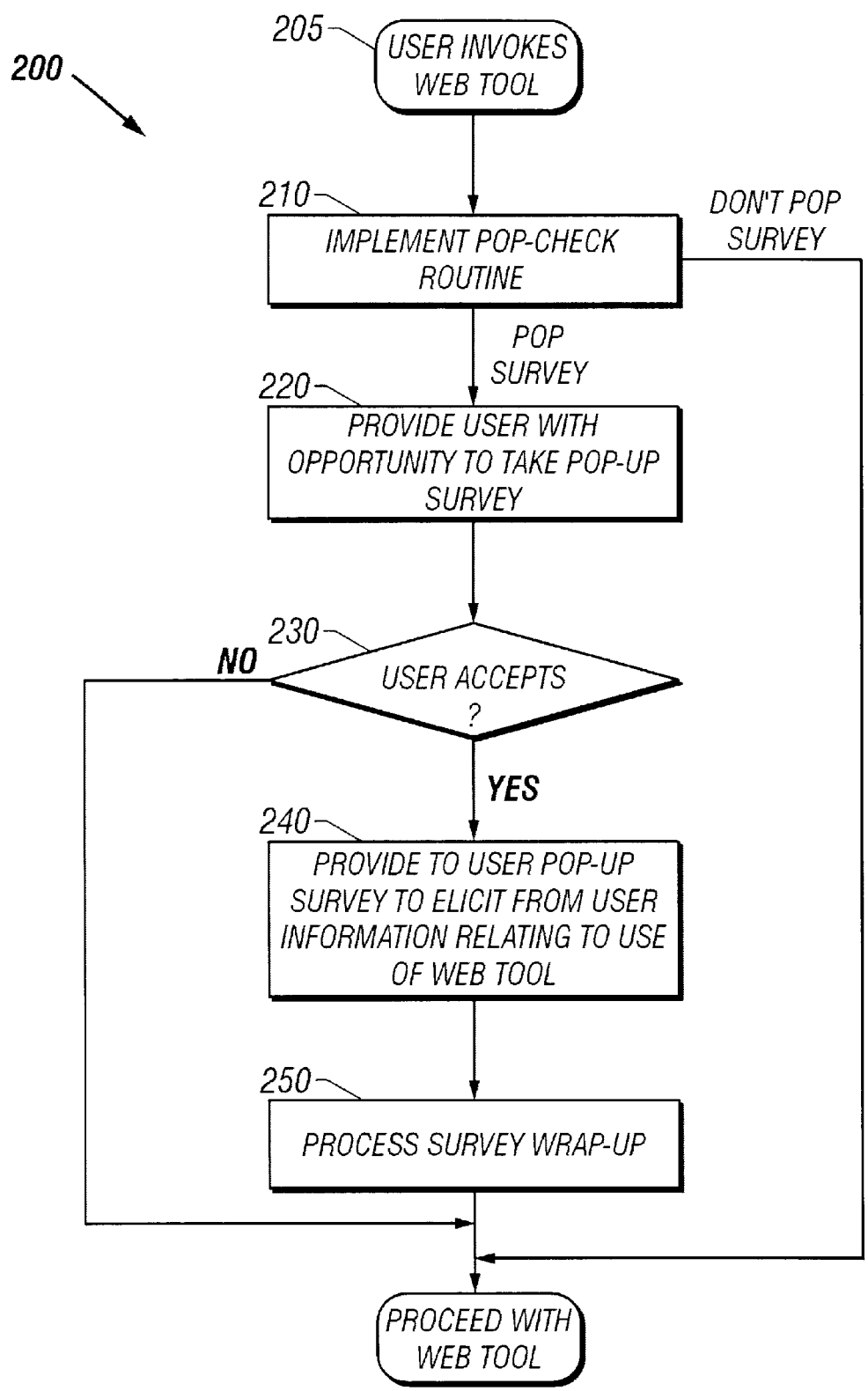
FIG. 2A depicts one embodiment of a pop-up survey routine of the present invention.

The pop-up survey servlet 116 includes pop-up survey program 117 for implementing a pop-up survey routine—one embodiment of which will be addressed in greater detail below in relation to FIG. 2—for providing to web users user group, pop-up surveys of the present invention. Pop-up survey program 117 may be derived using any suitable programming language such as PearlScript. As will be discussed below, the web tool web pages (which are executed by a user's web browser) include scripts and/or commands that invoke the pop-up survey program 117 on the servlet 116. It should be recognized, however, that the depicted scheme for providing the pop-up surveys of the present invention is one of numerous ways to do so. For example, any suitable executing program—whether executing in a Java servlet, as a client-side script, within the Internet server itself, or in any other communicatively linked platform could be used for implementing a pop-up survey program. Any operable program(s) or script(s) could be implemented using, for example, a common gateway interface (CGI) written in Perl, C, C++, Java, or another language that supports CGI, or using a web-enabling toolkit such as Active Server. In addition, while in the depicted embodiment, the survey data is collected through the servlet 116 and transferred to the database 119 for storage and retrieval, any other suitable configuration could be used. For example, in one embodiment, user's answers to survey questions are routed by executing client-side scripts from the user computers 120 to third party database servers (not shown) such as those belonging to a contracted, usability test consultant.

FIG. 2 shows one embodiment of a pop-up survey routine 200. The routine begin in response to a user invoking a web tool, which is shown at step 205. This could correspond to any action, as desired by a designer, undertaken by a web user while using the web tool. Because the purpose of a user-group survey is to identify general characteristics that apply to actual users of a particular web tool, in one embodiment of the present invention, the pop-up routine is invoked in response to the user initiating execution of the web tool. This increases the likelihood that the surveyant is actually a user of the tool. For example, with a search engine tool, the pop-up survey routine could be initiated in response to the user clicking on the button that initiates (or activates) the user's desired search. Note that the pop-up survey windows may or may not include scroll bars.

Next, at step 210, a pop-check routine 210 is implemented. One embodiment of a routine for implementing this step will be described in greater detail below in relation to FIG. 2B. The purpose of a pop-check routine is to determine whether or not the specific user should be presented with the option to take the pop-up survey. If the pop-check routine 210 returns a value indicating that the user should not be given an opportunity to take the survey, then the routine skips to its end, and the user proceeds with the web tool. On the other hand, if the pop-check routine 210 returns a value indicating that the user should be given the opportunity to take the survey, then the routine proceeds to step 220. At step 220, the user is provided with the opportunity to take the survey. At step 230, if the user declines, opting not to take the survey, the routine skips to the end, and the user proceeds with the web tool. Conversely, if the user accepts and decides to take the survey, the routine proceeds to step 240.

At step 240, the user is provided a pop-up survey. The survey is provided to elicit from the user information relating to the user's use of the web tool. A pop-up survey is a survey that is implemented through a web site to a web user. It includes one or more questions that in a preferred embodiment are presented to the user through a "pop-up" window. The pop-up survey should include questions that are easy to understand by a user. In addition, a user should be able to conveniently complete the survey. Along these lines, in one embodiment of the present invention, only ten or less questions are presented in a pop-up survey. These questions may be presented in one or more windows depending on the size of the questions as well as their possible answers. A trade-off exists between using separate windows for different questions and using just one window for the entire survey. On the one hand, using a separate window for each (or a few) questions so that the user is not required to scroll down a window to answer the questions will make it more convenient for a user to take the survey. On the other hand, using a single window—albeit with a scroll bar—may reduce the time required by the user to take the survey, because less Internet communication will be required, e.g., between the user's computer and a pop-up survey server.

Other considerations in making a pop-up survey more convenient to a user include the use of click-through windows. For the purposes of this disclosure, a click-through window is a survey window that requires only the use of mouse clicks (or corresponding key strokes) for the user to respond to the question or questions in the window. For example, open-ended questions requiring potentially the entire keyboard would not be included in click-through windows. (It should be noted, however, that the present invention includes embodiments that may not exclusively—or even at all—use click-through windows.)

Another important design consideration for making the pop-up survey more convenient to a user involves the use of dynamic questions. A dynamic question is a question whose presentation or content depends on the user's answers to previous questions. Depending on a user's answer to one or more questions, a dynamic question would generate a question whose content depends on the user's previous answers, or it may not present any question whatsoever. For example, in a user group survey relating to a search engine web tool, a user might be asked what type of operating system environment he/she primarily uses. If the answer were Windows-based operating systems, then follow-up questions could be directed specifically to Windows-based systems, and questions relating to other operating system types would be suppressed.

Once the user completes the survey, the routine proceeds to step 250. At step 250, the routine "wraps up" the survey. This could involve any number of housekeeping tasks such as acquiring identifying information from the user so that the user could be notified if he/she wins a prize or is to receive a gift. After wrap-up, the routine ends and the user proceeds with the web tool.

Figure 2B:
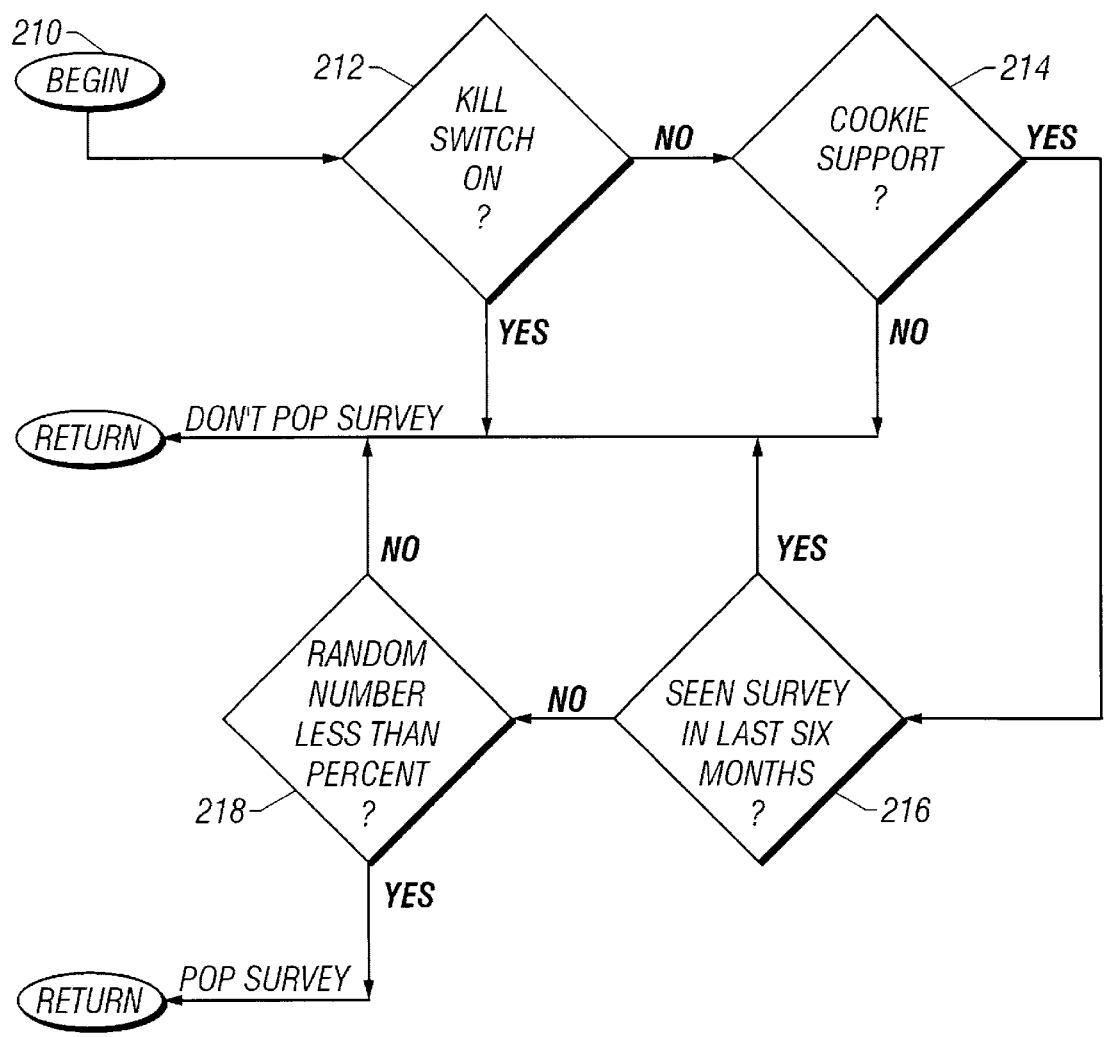
FIG. 2B shows one embodiment of a pop check routine of the present invention.

FIG. 2B shows one embodiment of the pop-check routine, which begins at 210. Initially, at 212, it is determined whether a kill switch is active. A kill switch can be used by a designer to conveniently inactivate the pop-up survey routine for a desired period of time. If the kill switch is active, the routine returns a "don't pop" value at step 210, indicating that the user should not be given an opportunity to take the survey. On the other hand, if the kill switch is not active, the routine proceeds to decision step 214.

At step 214, the routine determines whether the user's browser is configured to support cookies. If it is, the routine proceeds to decision step 216. Conversely, if the user's browser will not receive cookies, then the routine returns a don't pop value at step 210.

At decision step 216, the routine determines whether or not the user has seen the particular survey within the last six months. This involves initially checking to see whether the user has a cookie corresponding to the pop-up survey routine. If no such cookie exists, then the routine assumes that the user has not been presented with the survey in the last six months. On the other hand, if such a cookie is stored within the user's system, the routine checks its contents to specifically determine when the user, if at all, was last presented with a pop-up survey. Either way, if it is determined that the user has been presented with the survey in the last six months, then again, the routine returns a value at step 210 indicating that the survey is not to be popped. Conversely, if it is determined that the user has not received the survey in the last six months, then the routine proceeds to decision step 218.

At decision step 218, the routine generates a random number and determines whether or not it is less than a pre-specified value. The pre-specified value corresponds to the percentage of users of the particular web tool who are to be presented with an opportunity to take the survey. That is, a web tool administrator can specify through this value the percentage of users who are to receive the opportunity to take the survey. In one embodiment, a random number between 1 and 100 is generated. In this way, the actual desired user percentage can be directly compared with the generated random number. For example, if a web tool manager assigns a percentage value of 40 (indicating that 40% of the web tool's users are to receive an option to take the survey), then if the generated number is less than 40, the user will receive an invitation to take the survey. Conversely, if the randomly generated number is greater than 40, then the survey invitation would not be popped. One benefit of using a pop-up survey server or servlet is that a centralized table can be used to conveniently store these percentage values for various different pop-up surveys within an organization, which may be used by various different groups. With such a table, a server administrator can easily change a percentage value in response to a survey manager's request without having to locate and change the specific program code for the survey in question.

From decision step 218, if the random number is not less than the pre-defined percent value, then the routine returns a value at step 210 indicating that the user is not to be presented with the survey option. On the other hand, if the generated random number is less than the pre-defined percentage value, then the routine returns a value at step 210 indicating the user is in fact to be presented with an invitation to take the pop-up survey.

Figure 3A:
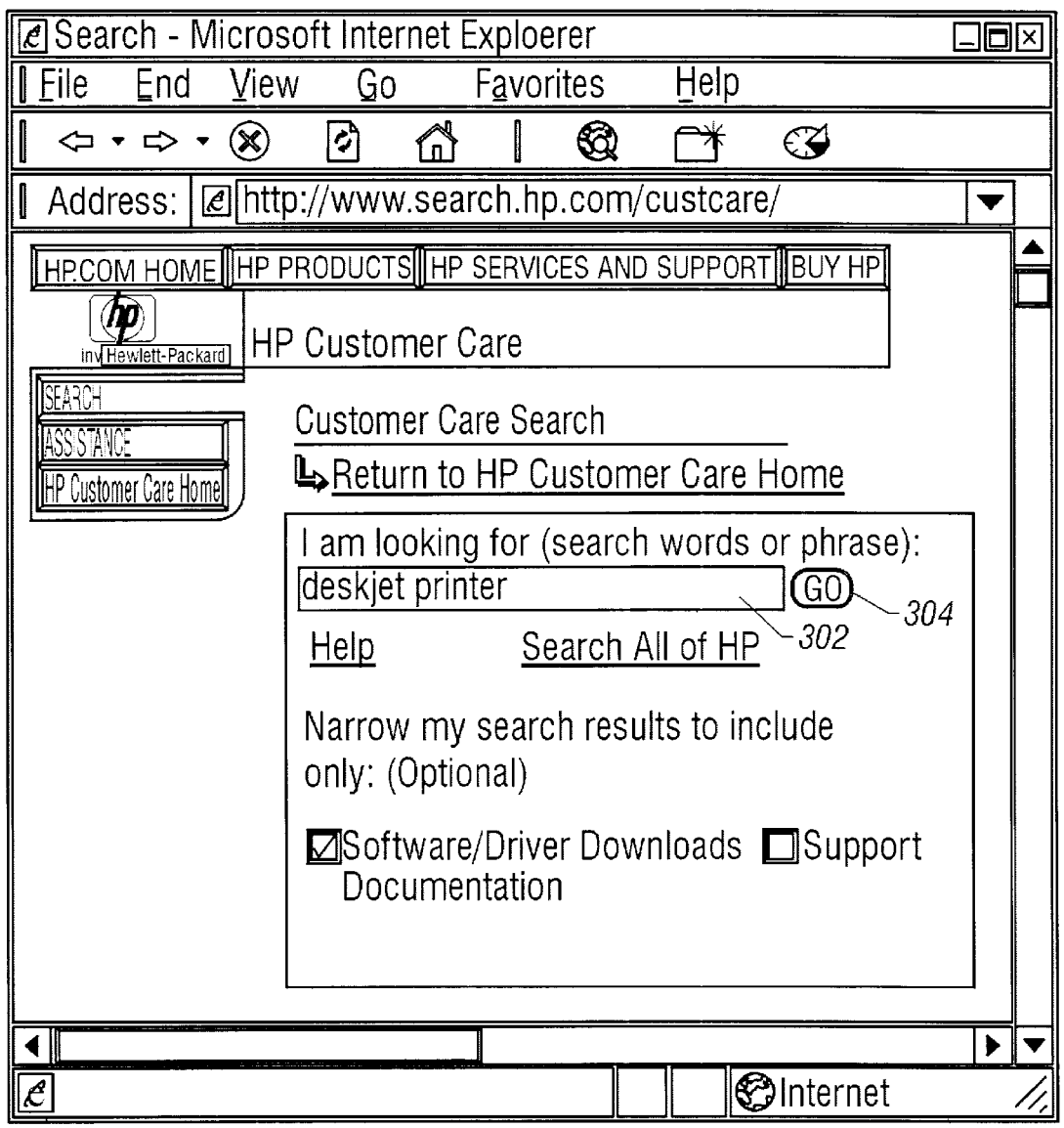
FIGS. 3A, 3B, 3C, 3D, 3E, 3F, 3G, 3H, and 3I show web screen prints of pop up windows in one exemplary pop-up survey for a search engine tool.

FIGS. 3A–3I show web screens from an exemplary implementation of a pop-up survey for a search engine web tool. FIG. 3A shows the screen that enables a user to perform a search with a search engine. This screen includes a search-engine key terms field 302, along with a "go" button 304 for invoking the search engine. As shown in this example, a user has typed "desk jet printer" as key terms to be searched by the search engine.

Figure 3B:
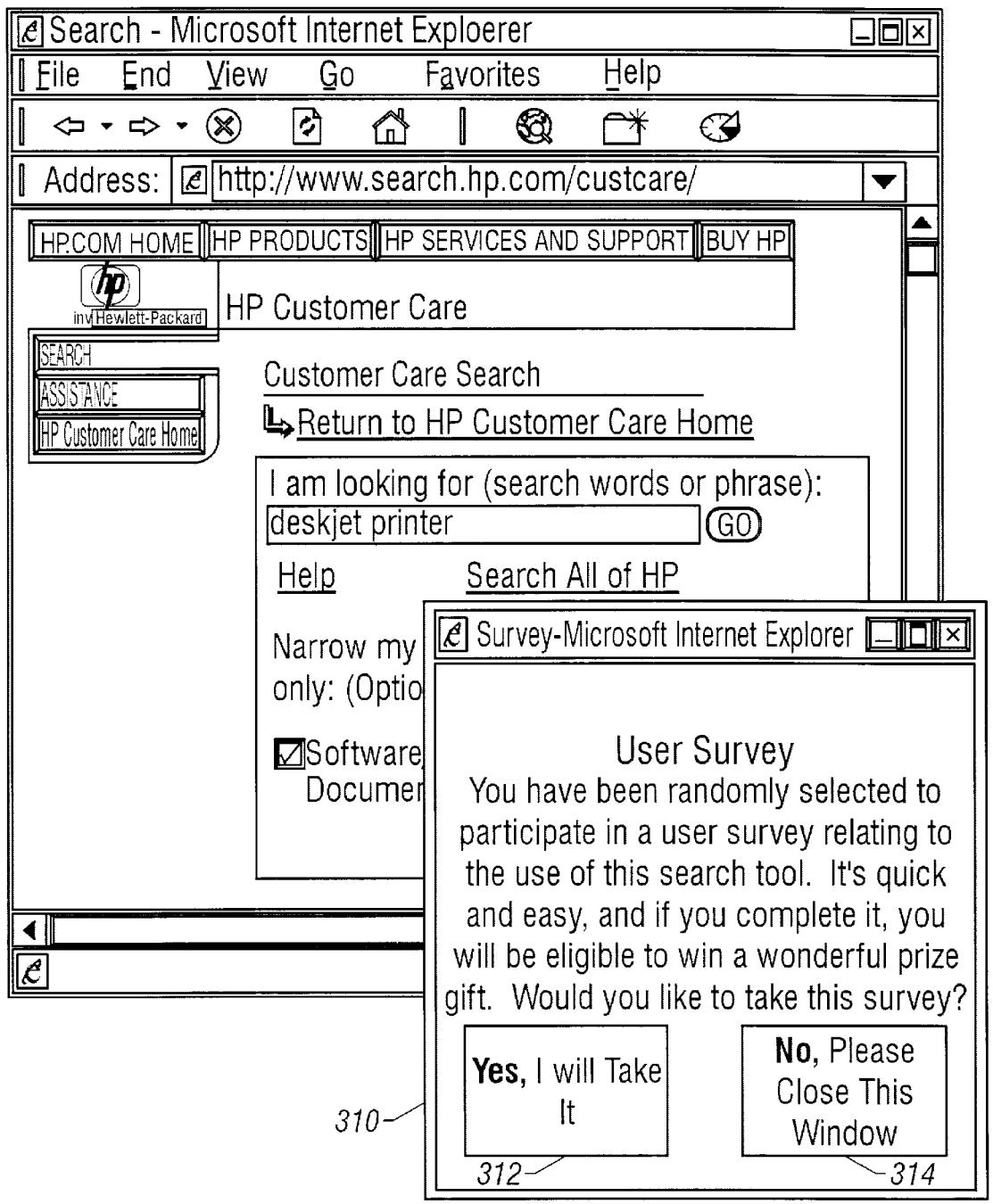

FIG. 3B shows the next screen in this example. This screen includes pop-up window 310, which serves to present the user with an invitation to take the user group pop-up survey. The generation of this screen would correspond to step 220 in the pop-survey routine of FIG. 2A. In window 310, the user is presented with an explanation of the survey, as well as an offer to take the survey in return for the chance to win a "wonderful prize gift." Finally, the user is asked to decide whether or not he/she will take the survey. A yes button 312 is provided for the user to click if he/she accepts the invitation, and a no button is provided for the user to click in order to decline the invitation. If the no button 314 is clicked upon, window 310 goes away and the user can proceed with the search engine tool. On the other hand, if the user clicks the yes button 312, then the screen in FIG. 3C is presented to the user.

Figure 3C:
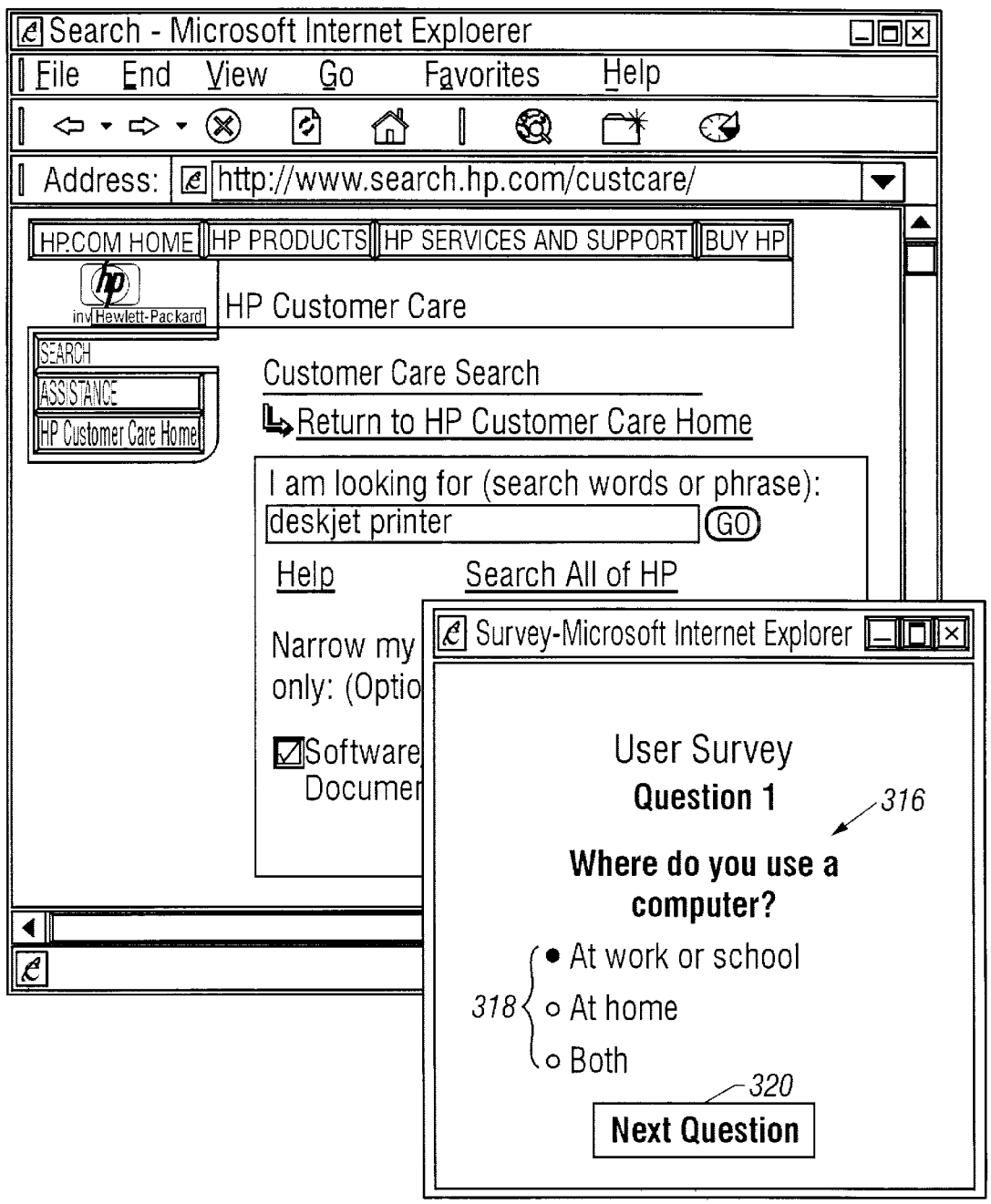

FIG. 3C shows the next pop-up window, which will appear after the user has accepted the invitation to take the survey. This window includes the first question 316 of the user group survey. The user answers the question by selecting one of the radio buttons at 318 that corresponds to his/her answer. (Radio buttons are a series of on-screen buttons that allow only one selection. If a button is currently selected, it will de-select when another button is selected.) The user then clicks on the next question "button 320" to proceed to the next question.

Figure 3D:
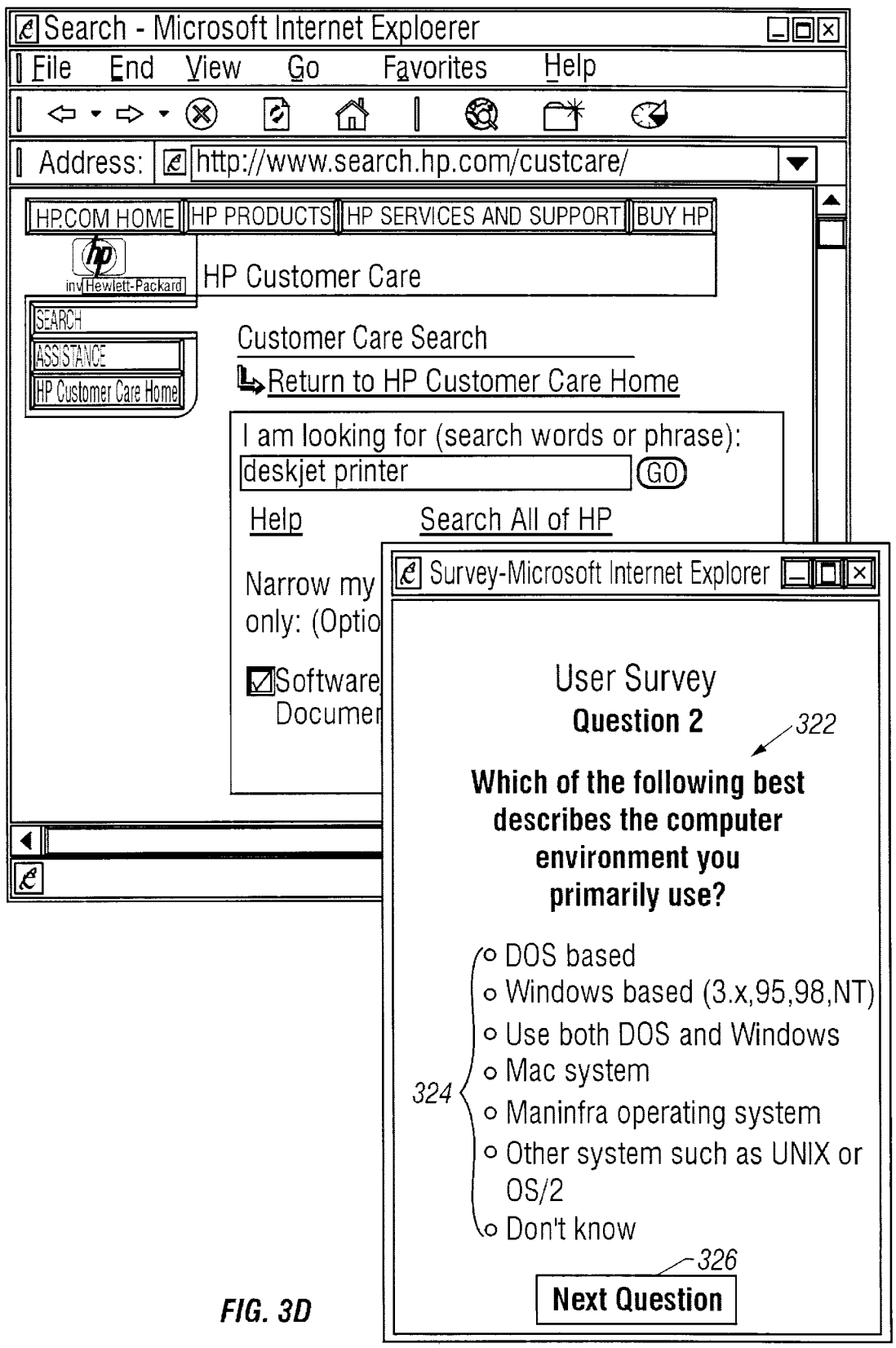

FIG. 3D shows the next pop-up window that appears and, as with the previous question, the user selects the most appropriate answer from a set of answers 324. After making the selection, the user clicks on the next question button at 326 to proceed to the next question.

Figure 3E:
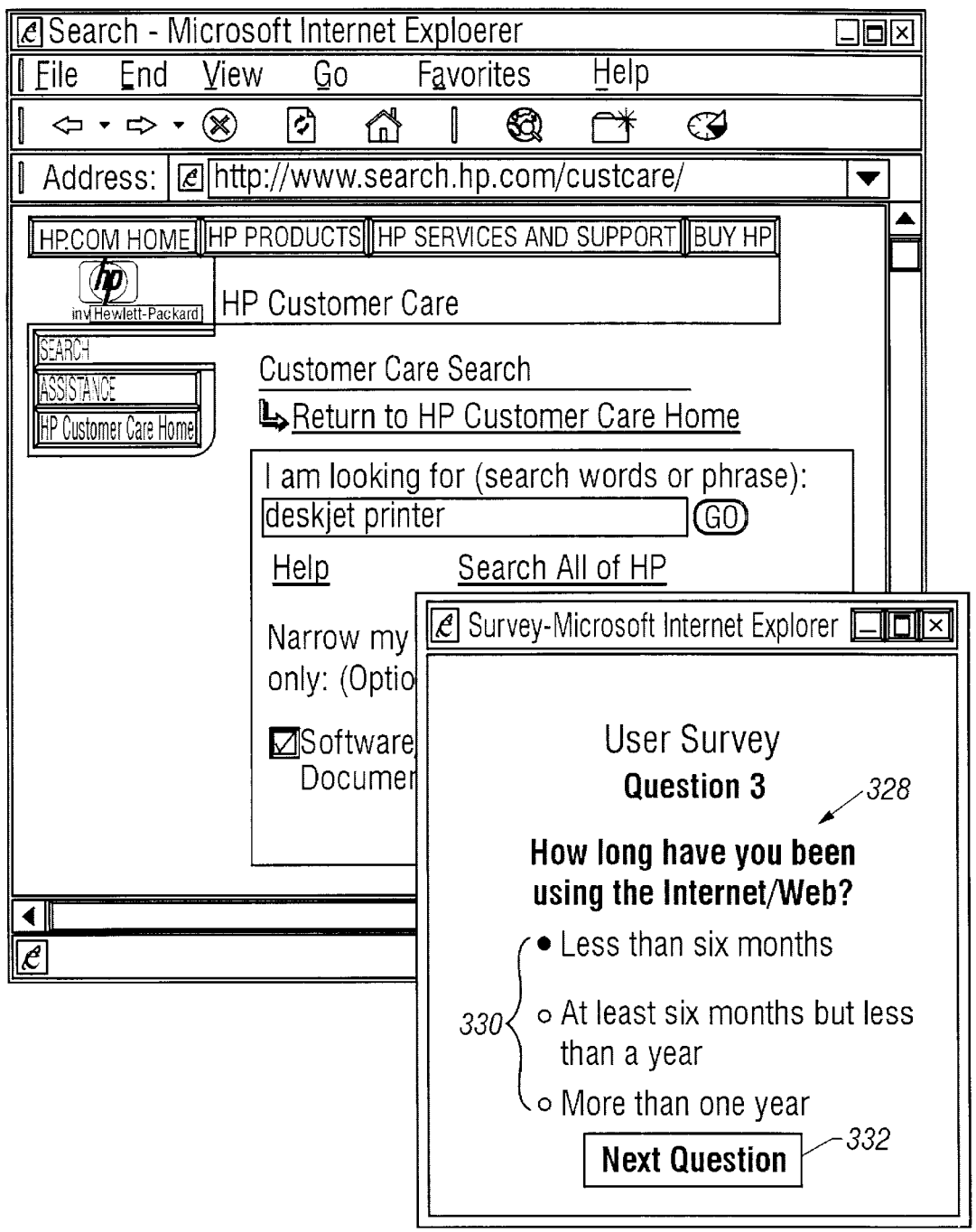
Figure 3F:
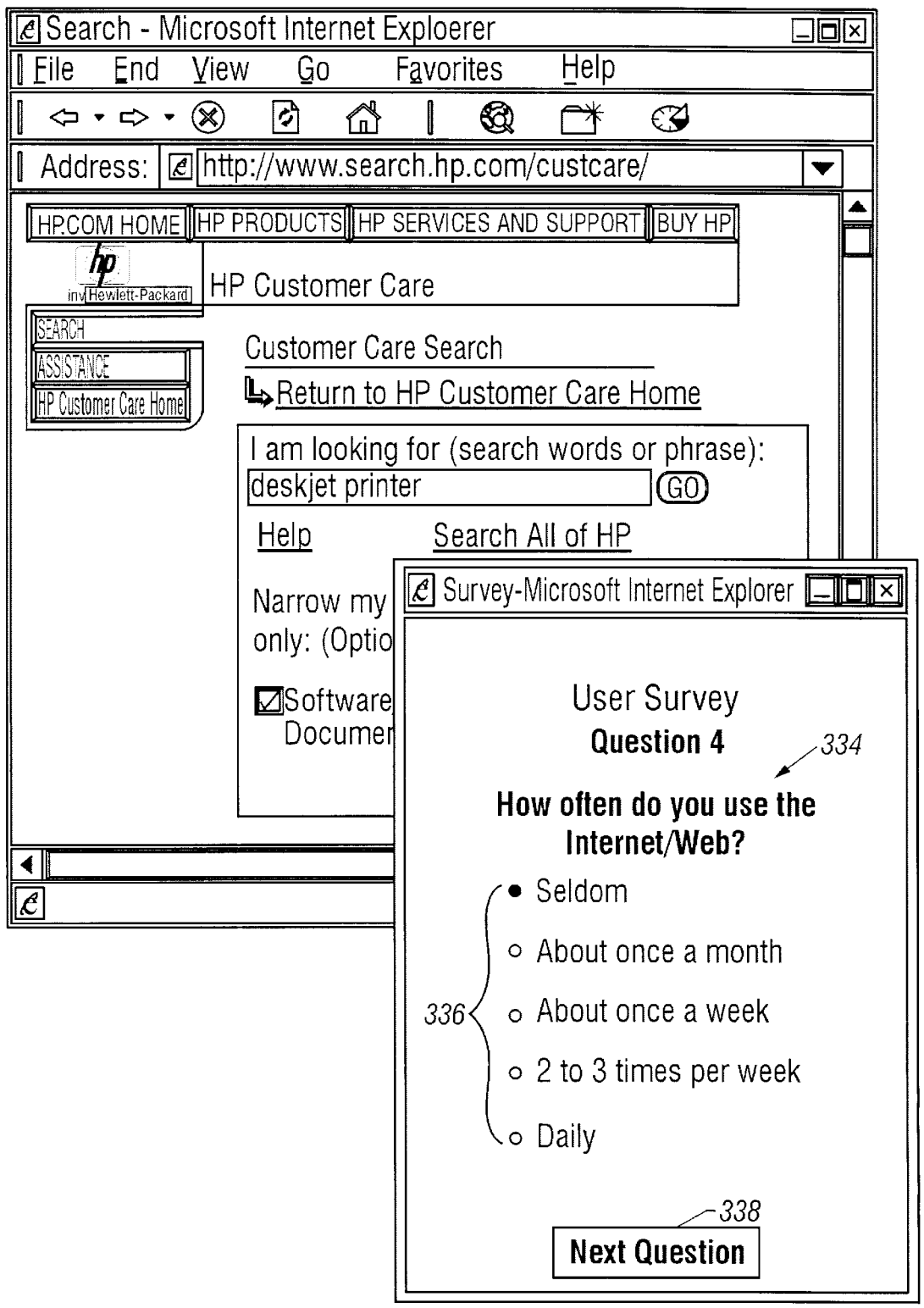

FIGS. 3E and 3F show questions 3 and 4, respectively. These windows operate similarly to those from questions 1 and 2.

Figure 3G:
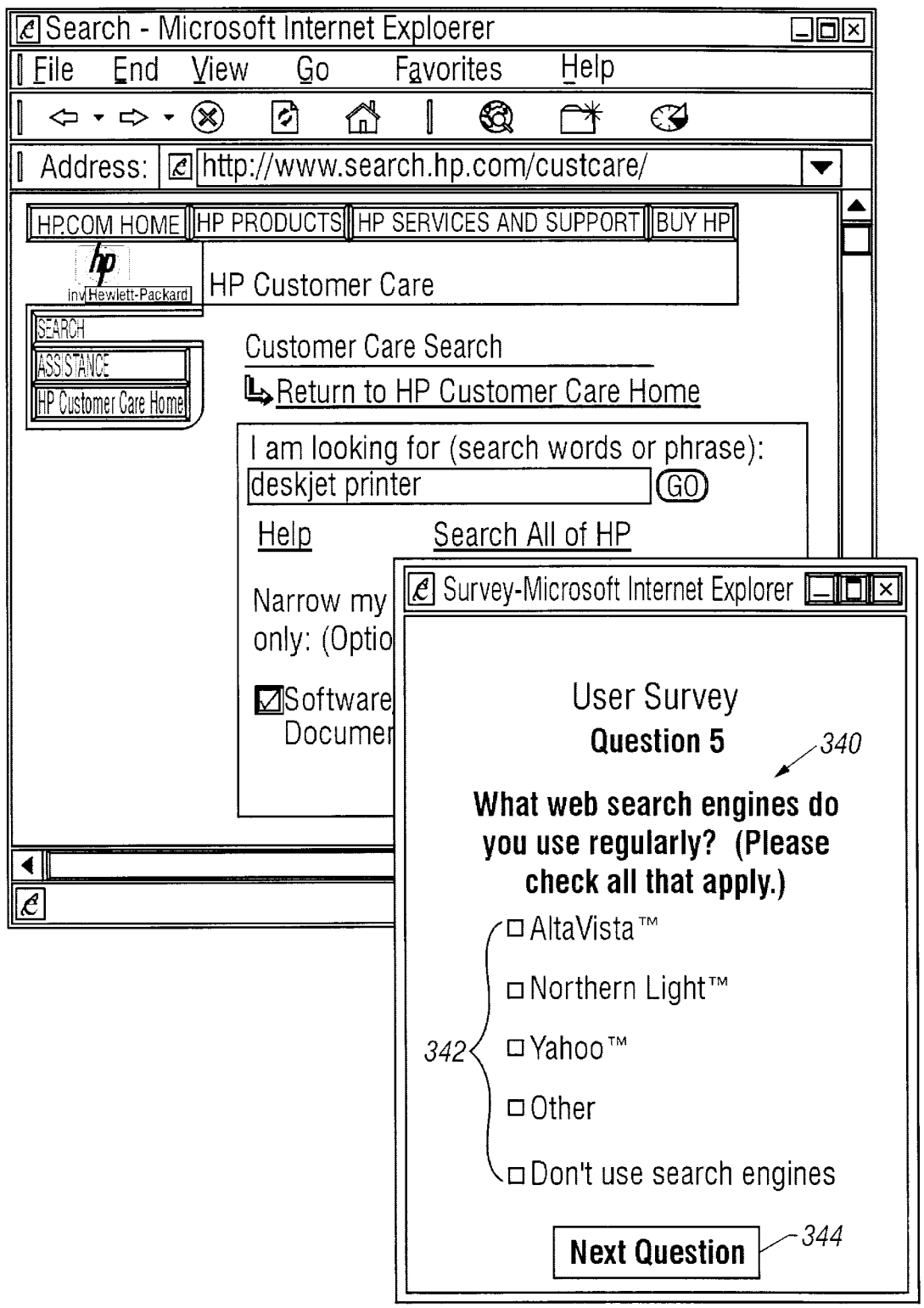

Turning to FIG. 3G, question five at 340 is presented in the next pop-up window. Unlike the previous questions, however, this question asks for the user to check all possible answers that apply. Thus, check boxes, rather than radio buttons, are used for this question. In answering this question, the user selects from the set of possible answers at 342 and again, depresses the next question button at 344.

Figure 3H:
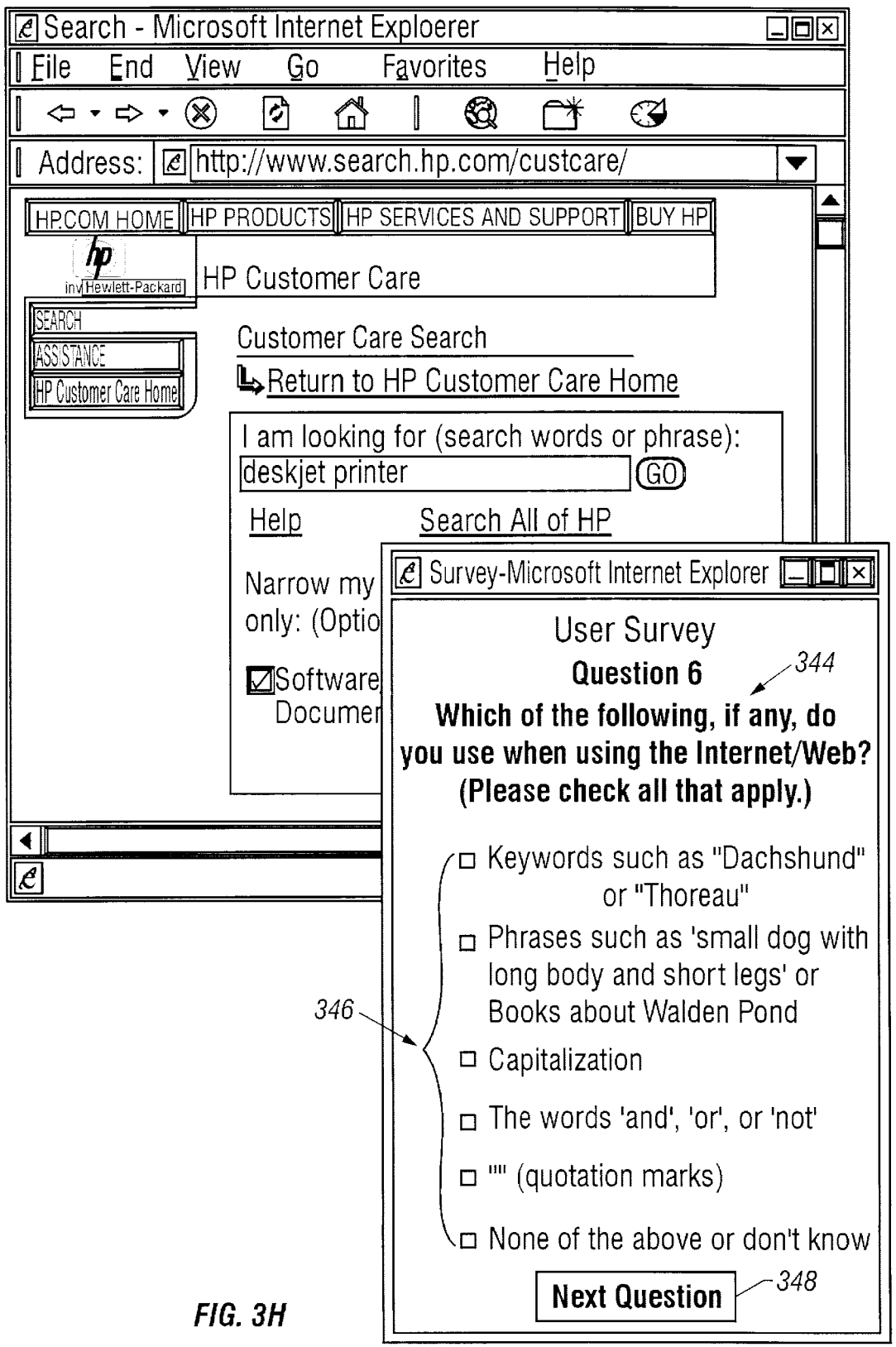

FIG. 3H shows the next pop-up window that would appear. This window includes question six at 344. Like question five, this question asks the user to check all of the answers 346 that apply. After selecting appropriate answers, the user clicks on the next question button at 348 to proceed with the survey. It is worth noting that this question deals with the type of search terms the user utilizes in a keyword search tool. If the user were to select the "none of the above" or "don't know" box, then the survey would end at this question. On the other hand, if the user selects any combination of the other answers, then the routine will proceed to the next and final question in this example. Assuming that the user does not check the "none of the above" or "don't know" box, the seventh (and final) question appears in FIG. 3I.

Figure 3I:
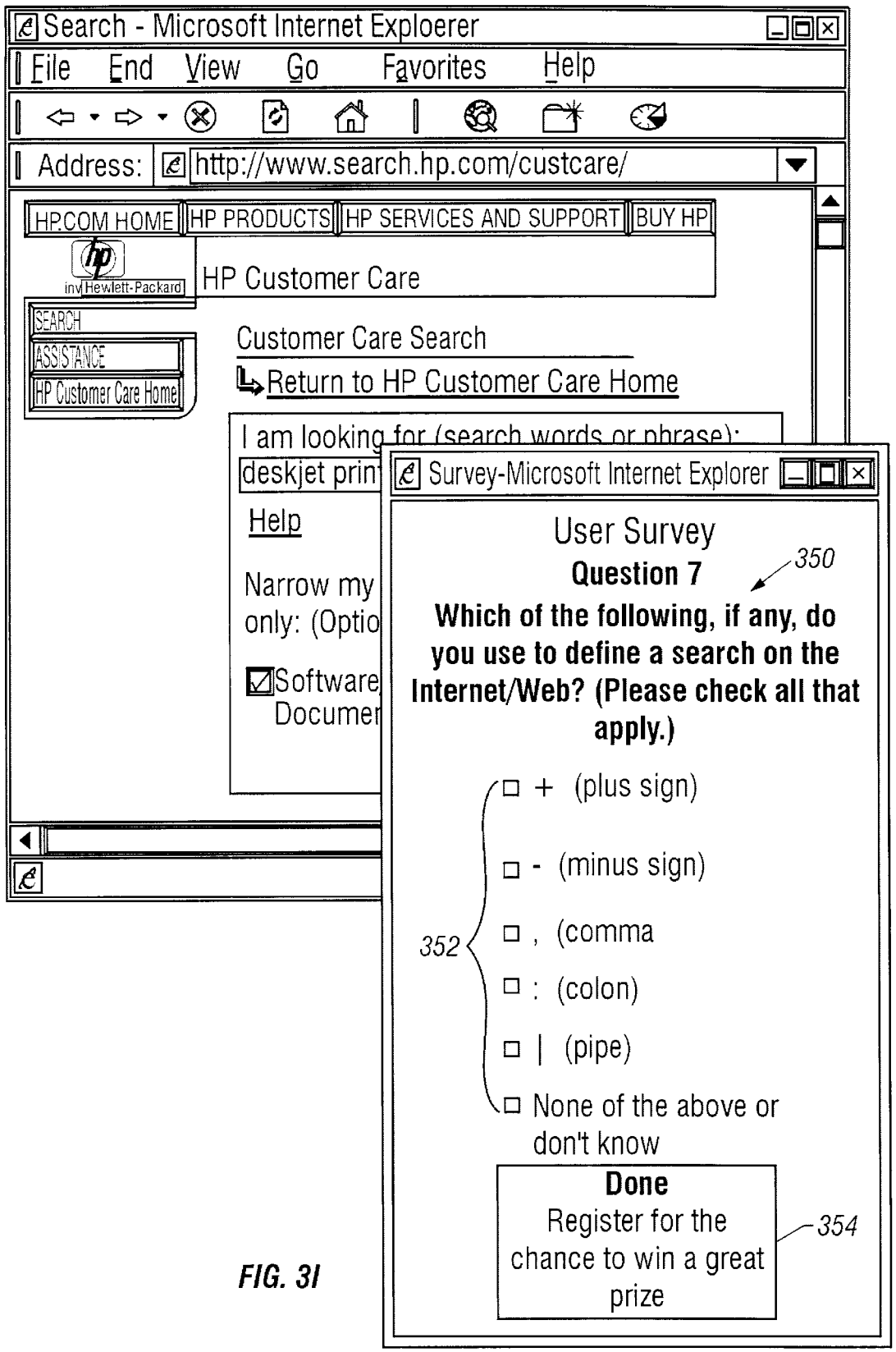

FIG. 3I shows the last question (question seven) 350 of this survey. This question essentially asks the user to check various characters from a set of possible character answers 352 that the user utilizes in implementing a search on the Internet. This question relates to a keyword search, and thus, would not be presented to the user if it had selected the "none of the above" or "don't know" box from the previous question. Accordingly, question seven is an example of a dynamic question because whether or how it is presented depends on the user's answer to a previous question— namely, his/her answer to question six. After answering this question by checking the appropriate boxes, the user clicks a "done" button at 354. By checking this button, a screen will appear for acquiring personal information from the user needed to register the user for his/her chance to win the gift prize. (This screen is not shown.) After this has been completed, no additional pop-window appears and the user can proceed with the search engine tool.

Although exemplary embodiments of the present invention have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for acquiring user information from at least one user of a web tool, comprising:

providing the web tool to at least one web user over the Internet, wherein the web tool is a search engine;

providing to the web user, in response to the user initiating a search on the search engine, an opportunity to take a survey; and eliciting from the web user, through the survey, tool use information relating to use of the tool by the web's user.

2. The method of claim 1, further comprising providing the survey through one or more windows.

3. The method of claim 2, wherein providing the survey through one or more windows includes providing the survey through one or more click-through windows.

4. The method of claim 3, wherein providing the survey through one or more click through windows includes providing the survey through less than 10 click-through windows.

5. The method of claim 3, wherein each click-through window may be responded to exclusively by using a mouse.

6. The method of claim 1, wherein the tool use information is utilized to characterize a typical user of the web tool.

7. The method of claim 1, wherein providing to the web user the opportunity to take the survey includes offering the user a gift in return for taking the survey.

8. The method of claim 1, wherein providing to the web user the opportunity to take the survey includes offering the user a chance to win a prize in return for taking the survey.

9. The method of claim 1, wherein providing to the web user the opportunity to take the survey includes providing the opportunity if a predefined random criteria is satisfied.

10. The method of claim 1, wherein providing the opportunity includes providing the opportunity to the user if the user has not taken the survey within a predefined time period.

11. The method of claim 1, wherein the survey includes one or more dynamic questions.

12. The method of claim 1, wherein one or more pop up windows are used to present to the user questions for eliciting the user information.

13. A method for characterizing a user of a web tool, comprising:

providing the web tool over the Internet to one or more web users, wherein the web tool is a search engine;

providing, to randomly selected users in response to the user initiating a search on the search engine, the opportunity to take a pop-up survey; and acquiring characteristic user group information relating to the web tool.

14. The method of claim 13, wherein the administered survey includes dynamic questions.

15. The method of claim 13, wherein click-through windows are used in administering the survey.

16. The method of claim 13, wherein a selected user is enticed to take the survey with a chance to win a prize by agreeing to take the survey.

* * * * *

UNITED STATES PATENT AND TRADEMARK OFFICE
CERTIFICATE OF CORRECTION

PATENT NO. : 6,728,755 B1
DATED : April 27, 2004
INVENTOR(S) : William S. de Ment It is certified that error appears in the above-identified patent and that said Letters Patent is hereby corrected as shown below:

<u>Title page, Item [54] and Column 1, line 1,</u>
Title, delete "DYNAMIC USER PROFILING FOR USABILITY" and insert therefor
-- CHARACTERIZING USERS OF A WEB TOOL --

Signed and Sealed this

Twenty-fifth Day of January, 2005

JON W. DUDAS
*Director of the United States Patent and Trademark Office*